United States Patent [19]
Mori

[11] Patent Number: 5,791,270
[45] Date of Patent: Aug. 11, 1998

[54] SEWING DATA PROCESSING DEVICE WITH DATA EDITING FUNCTION

[75] Inventor: Tomohiko Mori, Nagoya, Japan

[73] Assignee: Brother Kogyo Kabushiki Kaisha, Nagoya, Japan

[21] Appl. No.: 769,444

[22] Filed: Dec. 19, 1996

[30] Foreign Application Priority Data

Dec. 20, 1995 [JP] Japan ................................. 7-332364

[51] Int. Cl.$^6$ .............................. D05B 21/00; D05C 5/02
[52] U.S. Cl. .................. 112/102.5; 112/445; 112/470.04; 112/475.19; 364/470.09
[58] Field of Search .................. 112/102.5, 470.04, 112/470.06, 475.19, 456, 458, 445; 364/470.08, 470.09

[56] References Cited

FOREIGN PATENT DOCUMENTS

A-7-24160  1/1995  Japan.
A-8-112469  5/1996  Japan.

*Primary Examiner*—Peter Nerbun
*Attorney, Agent, or Firm*—Oliff & Berridge, PLC

[57] ABSTRACT

A sewing pattern is located with respect to a predetermined sewable region (103) based on sewing pattern data indicative of a shape of the sewing pattern. The angular position of the sewing pattern can be changed into another angular position. It is judged whether or not the angular position-changed sewing pattern fits within the sewable region. When it is judged that the angular position-changed sewing pattern fails to fit within the sewable region, the angular position of the sewing pattern is further changed into still another angular position. It is indicated that the angular position of the sewing pattern has been further changed.

20 Claims, 9 Drawing Sheets

SEWING DATA PROCESSING DEVICE WITH DATA EDITING FUNCTION

BACKGROUND OF THE INVENTION

1. Field of the Invention

The present invention relates to a sewing data processing device for processing sewing data for sewing embroidery patterns using home sewing machines and industrial sewing machines.

2. Description of the Related Art

Conventionally, a sewing data processing device has been proposed for an industrial sewing machine. The sewing data processing device includes a microcomputer and is capable of producing sewing pattern data with high accuracy. For example, the sewing data processing device is constructed from a personal computer system connected with an image scanner, a key board, a mouse, a hard disk driver, a CRT display, and the like. Based on original images of any desired embroidery patterns, the sewing data processing device can produce sewing pattern data indicative of sewing patterns in multi colors.

To meet the increasingly varied tastes of consumers and their desire for higher quality products, a home embroidery sewing machine is also desired to be provided with a sewing data processing device. The sewing data processing device can edit embroidery patterns, stored previously in the sewing machine, into those desired by an operator. For example, the sewing data processing device can enlarge and reduce the size of the embroidery patterns, rotate the embroidery patterns, change the intervals between the embroidery patterns are arranged. The sewing data processing device is relatively cheap and is easy to manipulate. With the sewing data processing device, therefore, the home embroidery sewing machine can sew not only the embroidery patterns previously stored in the sewing machine but also operator's desired any embroidery patterns.

SUMMARY OF THE INVENTION

The conventional sewing data processing device is designed to edit embroidery patterns while displaying the embroidery patterns. The sewing data processing device continuously shows the edited embroidery patterns even when the edited embroidery patterns protrude out of a sewable region of the sewing machine. The sewable region is defined as a region within which the sewing machine can sew embroidery patterns. An operator therefore has to manipulate keys many times to edit the embroidery patterns until the edited embroidery patterns can fit within the sewable region. This work is very troublesome and complicated.

It is therefore, an object of the present invention to overcome the above-described drawbacks, and to provide an improved sewing data processing device which is capable of judging whether or not the operator's edited embroidery pattern can fit within the sewable region of the sewing machine.

In order to attain these and other objects, the present invention provides a sewing data processing device for processing sewing data, the device comprising: positioning means for positioning at least one sewing pattern, with respect to a predetermined sewable region, based on sewing pattern data indicative of a shape of the at least one sewing pattern; first positional state changing means for changing the positional state of the at least one sewing pattern into another positional state; judging means for judging whether or not the positional state-changed sewing pattern fits within the sewable region; second positional state changing means for changing the positional state of the at least one sewing pattern from the other positional state into still another positional state when the judging means judges that the positional state-changed sewing pattern fails to fit within the sewable region; and indication means for indicating that the second positional state changing means changes the positional state of the at least one sewing pattern.

The first positional state changing means may include rotation means for rotating the sewing pattern about its center to thereby change an angular positional state of the sewing pattern. The second positional state changing means may include rotation means for rotating the positional state-changed sewing pattern about its center to thereby change an angular positional state of the sewing pattern. The second positional state changing means may change the positional state of the positional state-changed sewing pattern into the still another positional state until the judging means judges that the thus positional state-changed sewing pattern fits within the sewable region. The indication means may indicate a shape of the sewing pattern. The second positional state changing means may change the positional state of the positional state-changed sewing pattern a predetermined number of times at maximum.

According to another aspect, the present invention provides a sewing data processing device for processing sewing data, the device comprising: a positioning unit for positioning at least one sewing pattern, with respect to a predetermined sewable region, based on sewing pattern data indicative of a shape of the at least one sewing pattern; a first positional state changing unit for changing the positional state of the at least one sewing pattern into another positional state; a judging unit for judging whether or not the positional state-changed sewing pattern fits within the sewable region; and a second positional state changing unit for changing the positional state of the at least one sewing pattern from the other positional state into still another positional state when the judging unit judges that the positional state-changed sewing pattern fails to fit within the sewable region. The sewing data processing device may further comprise an indication unit for indicating that the second positional state changing unit changes the positional state of the at least one sewing pattern.

According to further aspect, the present invention provides a method of processing sewing data, the method comprising the steps of: positioning at least one sewing pattern, with respect to a predetermined sewable region, based on sewing pattern data indicative of a shape of the at least one sewing pattern; changing the positional state of the at least one sewing pattern into another positional state; judging whether or not the positional state-changed sewing pattern fits within the sewable region; and changing the positional state of the at least one sewing pattern from the other positional state into still another positional state when it is judged that the positional state-changed sewing pattern fails to fit within the sewable region. The method may further comprise the step of indicating that the positional state of the at least one sewing pattern is further changed.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
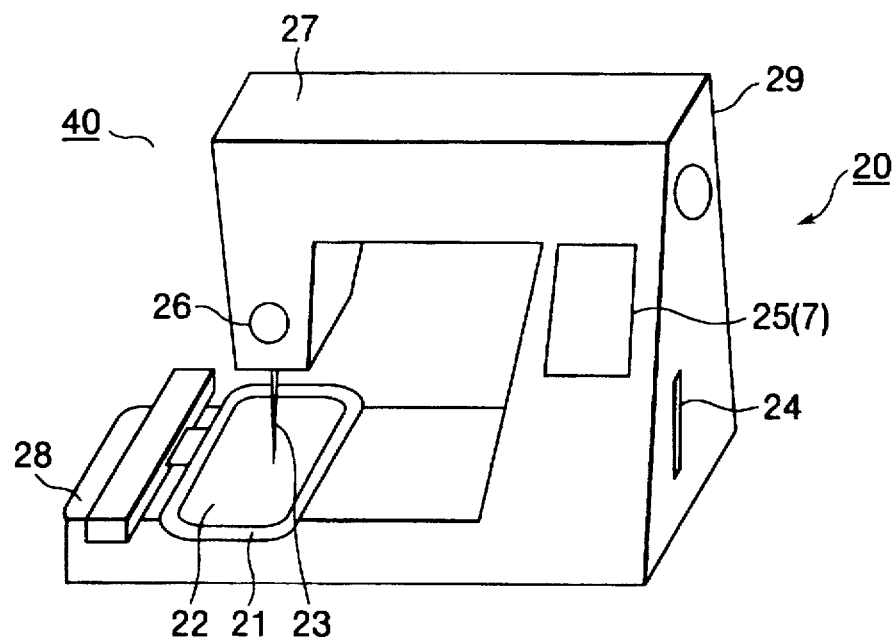
FIG. 1 is an external perspective view of a home embroidery sewing machine according to an embodiment of the present invention.

A sewing data processing device according to a preferred embodiment of the present invention will be described while referring to the accompanying drawings wherein like parts and components are designated by the same reference numerals.

This embodiment provides a home embroidery machine to which the sewing data processing device of the present invention is applied.

The overall structure of the home embroidery machine will be described with reference to FIG. 1.

The home embroidery machine 20 is for producing an operator's desired embroidery data and then sewing the operator's desired embroidery on a work fabric 22 based on the produced embroidery data.

Figure 2:
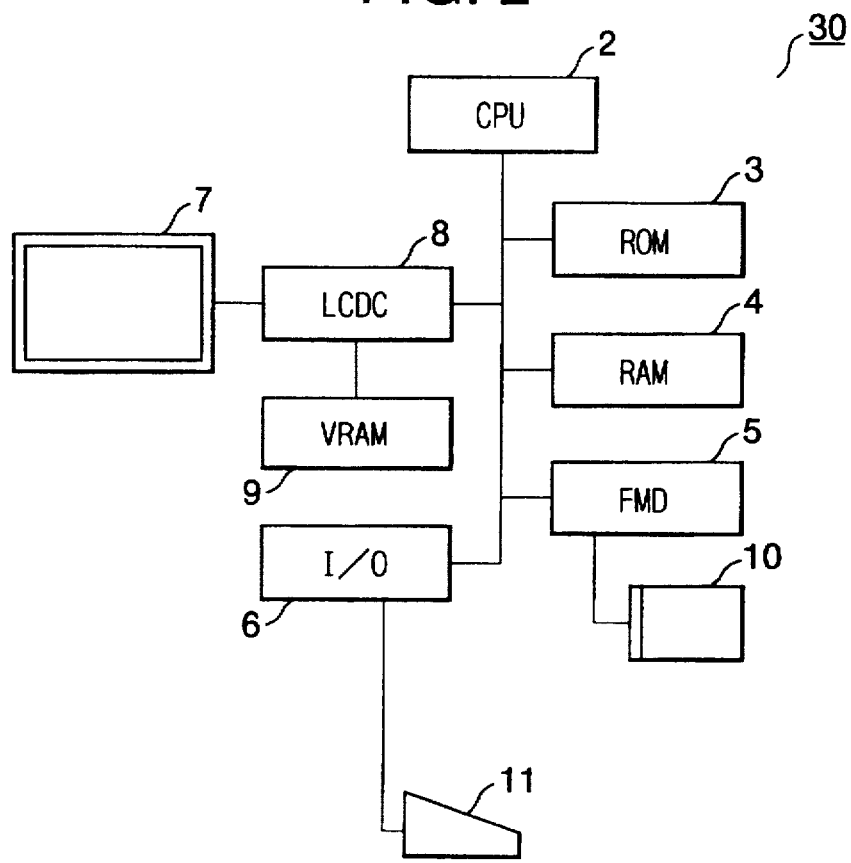
FIG. 2 is a block diagram showing an internal structure of a control portion (embroidery data producing circuit) employed in the sewing machine of FIG. 1.

The home embroidery machine 20 is comprised of a control portion 30 shown in FIG. 2 and a sewing portion 40 shown in FIG. 1. The sewing portion 40 is for sewing embroideries on a work fabric 22 based on embroidery data. The sewing portion 40 has a head portion 27, a bed portion 28, and a column portion 29.

The head portion 27 is provided with a stitching needle 23 which is controlled to move vertically relative to the bed portion 28. As shown in FIG. 1, a sewing start key 26 is mounted to the head portion 27.

The home embroidery machine 20 is operated with an embroidery frame 21 for supporting a work fabric 22 desired to be sewn with embroideries. The home embroidery machine 20 is provided with a horizontal movement mechanism (not shown) for moving the embroidery frame 21 horizontally along the bed portion 28. The horizontal movement mechanism moves the embroidery frame 21 to the operator's desired positions indicated by an X-Y coordinate system which is determined on the bed portion 28. With this structure, when the embroidery frame 21 moves the work fabric 22 in the horizontal direction, the stitching needle 23 moves vertically relative to the embroidery frame 21, thereby sewing the work fabric 22 with desired embroidery patterns.

It is noted that a sewable region 103 is defined as a region, within which the stitching needle 23 can sew embroideries on the work fabric 22. The sewable region 103 is defined on the X-Y coordinate system along the bed portion 28. The sewable region 103 id determined dependently on a range in which the horizontal moving mechanism can more the embroidery frame 21 along the bed portion 28.

The column portion 29 is provided with a touch panel 25 made from a liquid crystal display (LCD) 7. The touch panel 25 displays various screens shown in FIGS. 5–10 and 13 as will be described later. The column portion 29 is also formed with a flash memory insertion slot 24 for receiving a flash memory 10 therein.

The control portion 30 is for producing embroidery data indicative of the operator's desired embroidery, recording the embroidery data in the flash memory 10, and controlling the horizontal movement mechanism, based on the embroidery data, to horizontally move the embroidery frame 21 while actuating the stitching needle 23 vertically, thereby sewing the operator's desired embroidery on the work fabric 22.

As shown in FIG. 2, the control portion 30 is constructed from a microcomputer. The control portion 30 includes: a CPU 2, a ROM 3, a RAM 4, a flash memory device 5 for retrieving embroidery data from and recording embroidery data into the flash memory 10, a liquid crystal display controller (LCDC) 8, and an input/output interface 6, which are connected with each other via a bus line. The interface 6 is for receiving input data from an input portion 11. The LCDC 8 is connected with an image storage device (VRAM) 9 and the liquid crystal display (LCD) 7.

The flash memory device 5 includes: the flash memory insertion slot 24 for receiving a flash memory 10; and a data retrieving/recording unit for retrieving embroidery data from the recording embroidery data into the flash memory 10 inserted in the insertion slot 24.

The flash memory 10 previously stores therein a plurality of sets of embroidery data indicative of a plurality of embroidery patterns which can be sewn by the home embroidery machine 20. Each set of embroidery data includes coordinate data indicative of needle locations in the predetermined X-Y coordinate system for sewing a corresponding embroidery. With this structure, when the flash memory 10 is inserted by the operator into the flash memory insertion slot 24, the stored embroidery data is read out by the flash memory device 5.

The ROM 3 previously stores therein a plurality of sets of embroidery data indicative of a plurality of other embroidery patterns which can also be sewn by the home embroidery machine 20. Each set of embroidery data includes coordinate data indicative of needle locations in the predetermined X-Y coordinate system for sewing a cooresponding embroidery. As will be described later, the embroidery data will be used not only for sewing embroidery patterns on the work fabric 22 but also for displaying embroidery patterns 104 on a layout screen (FIG. 8) on the touch panel 25.

The ROM 3 also stores therein several sets of processing program data such as an embroidery producing program and a rotational state judging process program as will be described later. The ROM 3 further stores therein several sets of binary bit map data indicative of shapes of a plurality of embroidery patterns. The binary bit map data will be used for displaying images of embroidery patters on a pattern selection screen of FIG. 6 and on a selected pattern screen of FIG. 7 as will be described later. The ROM 3 also stores therein other various sets of bit map data necessary for producing the screens of FIGS. 5–10 and 13 which will be described later.

The LCDC 8 is for controlling the LCD 7 (touch panel 25) to display monochromatic bit map graphic screens of FIGS. 5–10 and 13 based on data which has been retrieved from the flash memory 10 or the ROM 3 and which is temporarily stored in the VRAM 9. The touch panel 25 is constructed from the thus produced screens. The operator can manipulate the touch panel 25 and control the home embroidery machine 20.

The RAM 4 is for storing embroidery data produced during an embroidery producing process as will be described later.

The input portion 11 includes the sewing start key 26 and the touch panels 25 produced on the LCD 7. The sewing start key 26 is for instructing start of a sewing operation. The touch panel 25 is for instructing selection of the operator's desired embroidery patterns and for instructing change of the positional states of the embroidery patterns. The instructions thus inputted at the input portion 11 are transferred via the interface 6 to the CPU 2 and the RAM 4.

The CPU 2 is for controlling the entire home embroidery machine 20. For example, the CPU 2 executes the embroidery producing program for producing the operator's desired embroidery data and then sewing the operator's desired embroidery accordingly. The CPU 2 also executes the rotational state judging process program, as a subroutine for the embroidery processing program, to judge whether or not the operator's selected embroidery pattern fits within the sewable region 103 when rotated as instructed by the operator.

With the above-described structure, the home embroidery machine 20 performs the embroidery producing operation. During the embroidery producing operation, the operator edits, with using the touch panel 25, embroidery data retrieved from the flash memory 10 and/or the ROM 3, to thereby produce embroidery data indicative of the operator's desired embroidery. In more concrete terms, the operator instructs the control portion 30 to select his/her desired embroidery pattern and to rotate the selected embroidery pattern. The control portion 30 then performs the rotational state judging operation to judge whether or not the rotated embroidery pattern will fit within the sewable region 103. When the rotated embroidery pattern will not fit within the sewable region 103, the control portion 30 further rotates the embroidery pattern so that the embroidery pattern will fit within the sewable region 103. The control portion 30 then calculates embroidery data indicative of the thus rotated embroidery pattern. The control portion 30 controls the sewing portion 40 to sew the rotated embroidery pattern on the work fabric 22 based on the produced embroidery data.

The home embroidery machine 20 performs the embroidery producing operation as described below.

Figure 3:
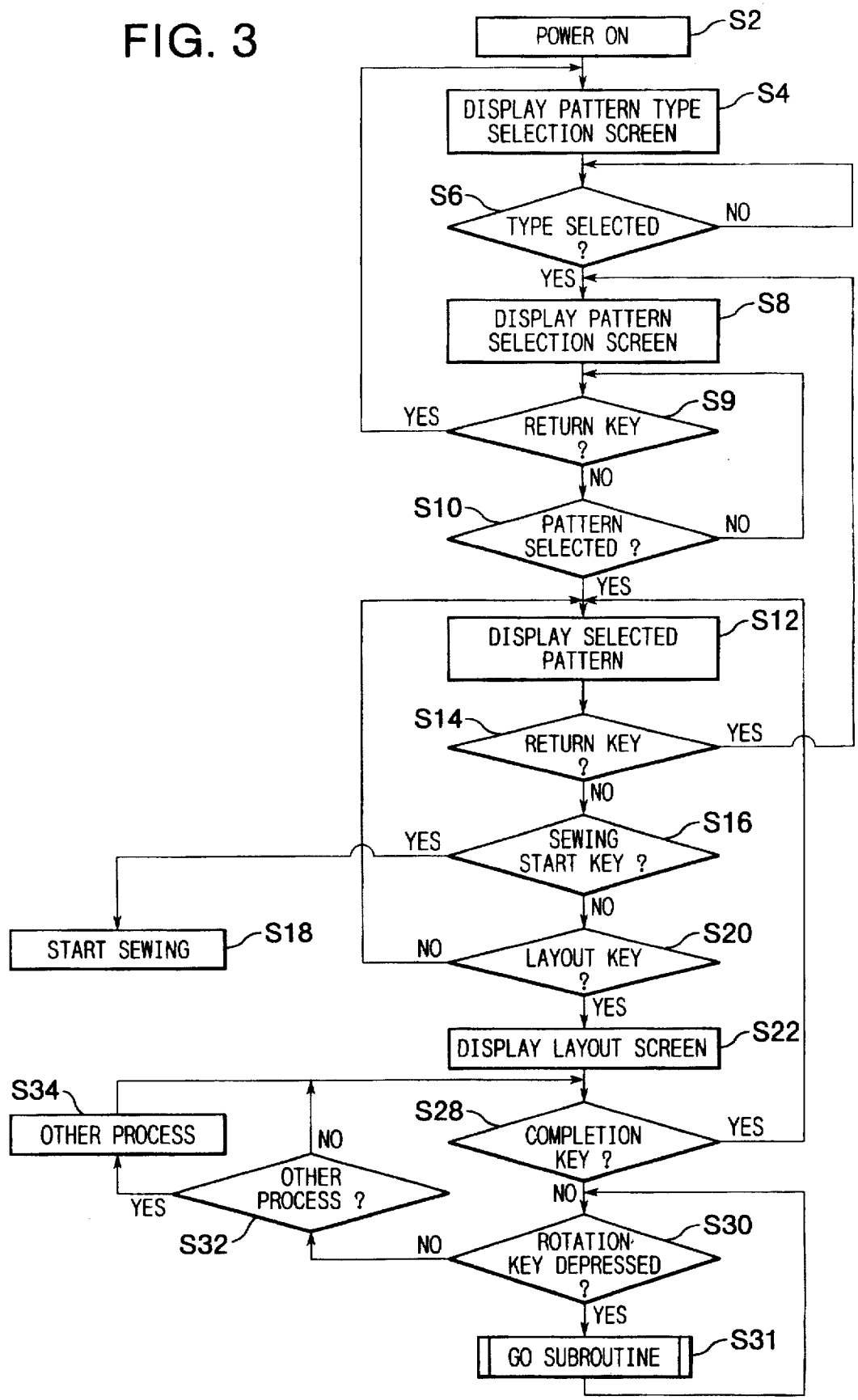
FIG. 3 is a flowchart of an embroidery sewing operation performed by the sewing machine of FIG. 1.
Figure 5:
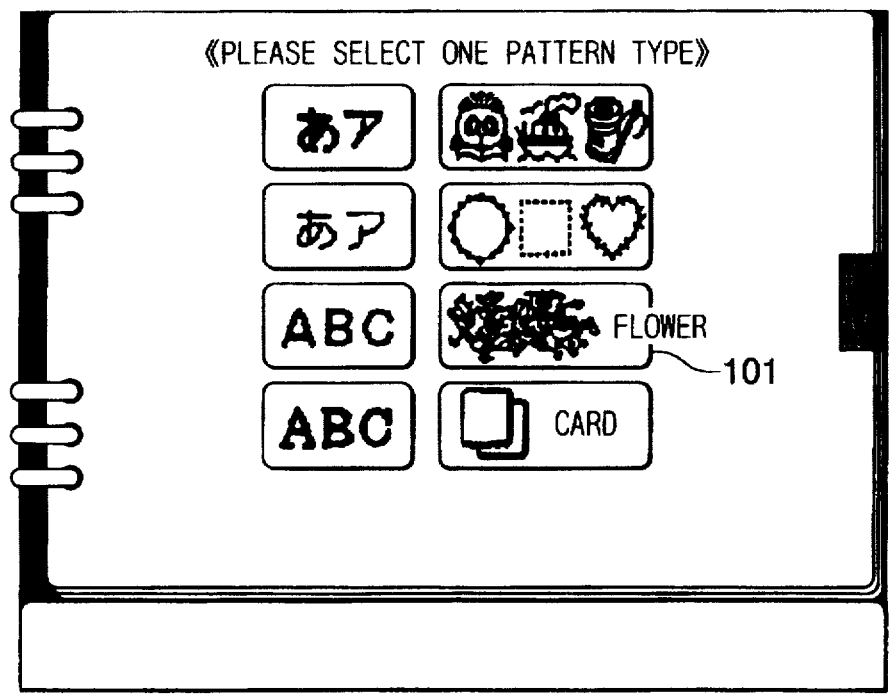
FIG. 5 shows one example of a pattern type selection screen displayed on a touch panel provided to the sewing machine of FIG. 1.

As shown in FIG. 3, when the operator first turns on the power to the embroidery machine 20 in S2, the CPU 2 controls the LCDC 8 to show a pattern type selection screen as shown in FIG. 5 on the touch panel 25 in S4.

Then, in S6, the operator selects one pattern type from among those displayed on the pattern type selection screen. It is now assumed that the operator selects a pattern type 101 shown in FIG. 5. When the pattern type 101 is thus selected (Yes in S6), the CPU 2 further controls in S8 the LCDC 8 to show a pattern selection screen shown in FIG. 6 on the touch panel 25. It is noted that the CPU 2 produces images of a plurality of embroidery patterns displayed on the pattern selection screen based on the bit map data retrieved from the ROM 3.

Figure 6:
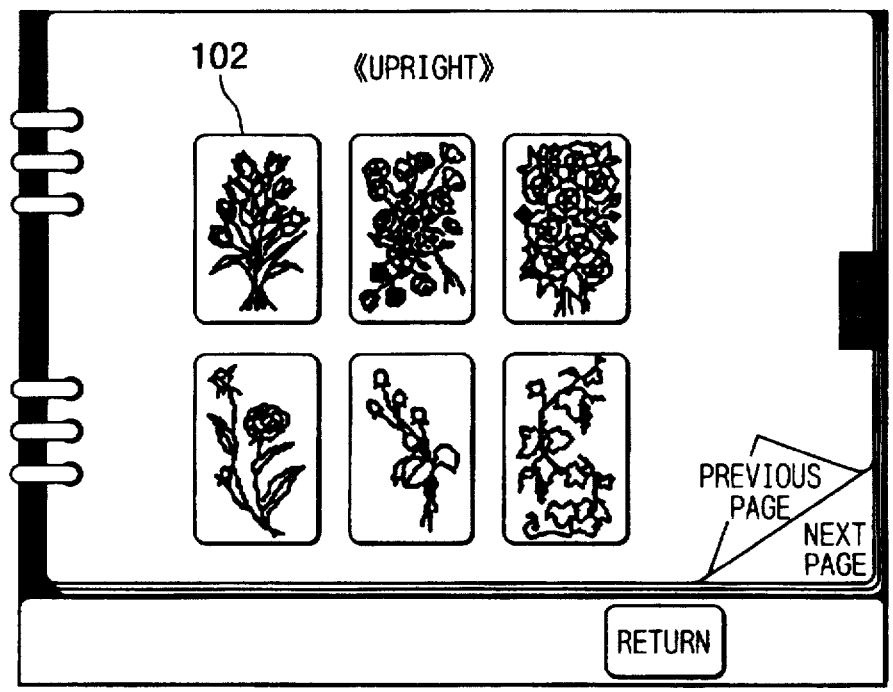
FIG. 6 shows one example of a pattern selection screen displayed on the touch panel of the sewing machine of FIG. 1.

When the operator depresses a return key on the pattern selection screen of FIG. 6 (Yes in S9), the screen goes back to the pattern type selection screen of FIG. 5, and the above-described steps S4 through S9 are repeated. Thus, another pattern type can be easily selected.

Figure 7:
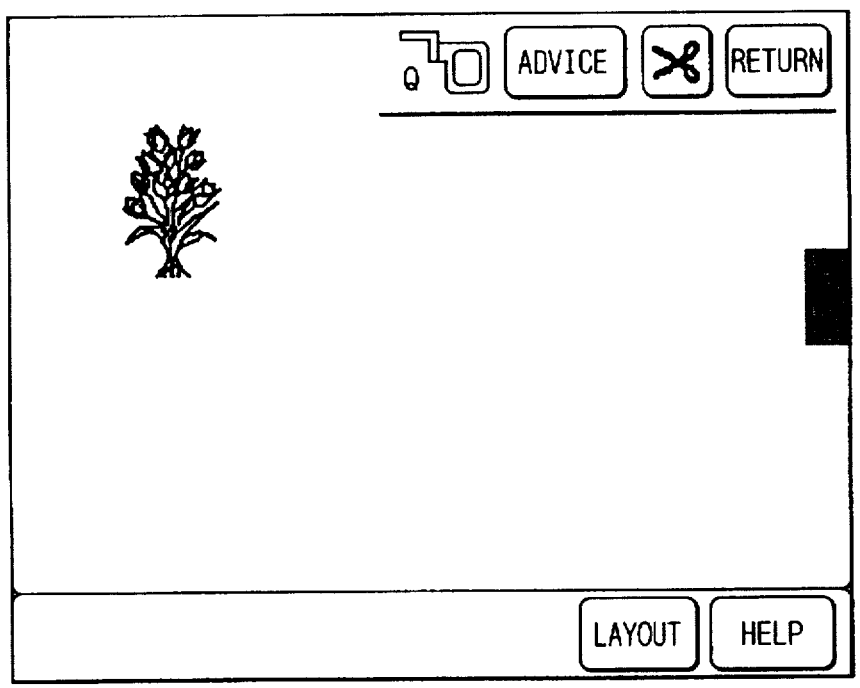
FIG. 7 shows one example of a screen showing a selected pattern displayed on the touch panel.

While the pattern selection screen of FIG. 6 is displayed, the operator can select one embroidery pattern from among the displayed patterns in S10. It is now assumed that the operator selects an embroidery pattern 102. When the embroidery pattern 102 is thus selected (Yes in S10), the CPU 2 controls in S12 the LCDC 8 to show the selected pattern on the LCD 7 as shown in FIG. 7. It is noted that the CPU 2 produces the image of the selected pattern screen of FIG. 7 also based on the bit map data retrieved from the ROM 3.

At this point, when the operator depresses a return key on the selected pattern screen (Yes in S14), the screen goes back to the pattern selection screen of FIG. 6. Then, the above-described steps S8 through S14 are repeated, thereby allowing the operator to select a plurality of patterns.

The operator can depress a layout key on the touch panel 25 (Yes in S20) while the selected pattern screen of FIG. 7 is displayed. When the operator depresses the layout key (Yes in S20), the CPU 2 controls the LCDC 8 to show a layout screen shown in FIG. 8 on the touch panel 25 in S22.

Figure 8:
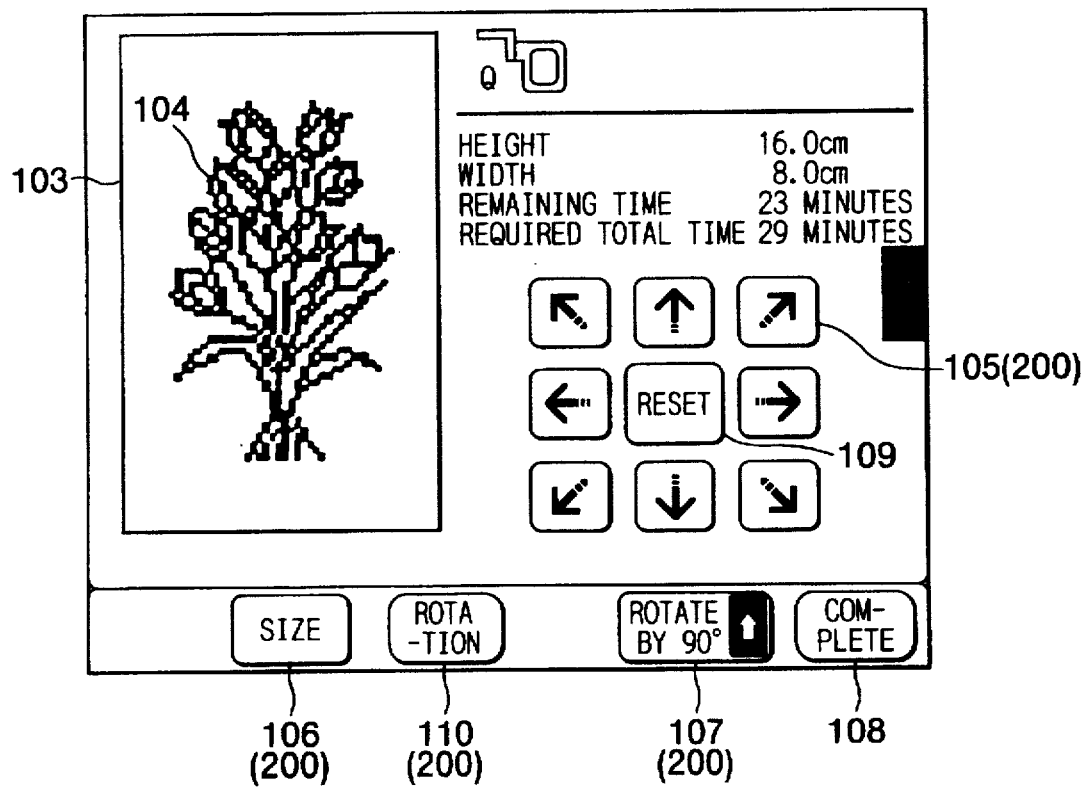
FIG. 8 shows one example of a layout screen displayed on the touch panel.

As shown in FIG. 8, the layout screen displays an image of the predetermined sewable region 103, within which the home embroidery machine 20 can sew embroideries with the stitching needle 23. The layout screen of FIG. 8 also displays an image 104 of the selected embroidery pattern 102. It is noted that the layout screen initially locates the embroidery pattern image 104 at the central position of the sewable region 103 until the operator depresses in S32 any arrow keys 105 which will be described below. In other words, until any keys 105 are depressed, the central position B of the embroidery pattern 104 has a coordinate (XB, YB) which is equal to the coordinate of the center in the sewable region 103. It is further noted that the CPU 2 produces the shape 104 of the embroidery pattern 102 based on the set of embroidery data for the selected embroidery pattern 102 which is retrieved from the ROM 3 or the flash memory 10. Accordingly, the layout screen can display a realistic image 104 of the selected embroidery pattern 102.

The layout screen also displays various layout changing keys 200. The layout changing keys 200 are for editing layout of the selected pattern 104. The layout changing keys 200 include: eight arrow keys 105; a size key 106; a 90-degree rotation key 107; and a rotation key 110. The arrow keys 105 are for moving the selected embroidery pattern 104 is moved by 0.1 mm in the arrow-indicating direction. The size key 106 is for enlarging or reducing the size of the selected embroidery pattern. The 90-degree rotation key 107 is for rotating the selected embroidery pattern 104 by 90 degrees about its center. The rotation key 110 is for rotating the embroidery pattern 104 about its center by a desired amount of angle. It is noted that the rotation key 110 may be designed to rotate the embroidery pattern 104 by a predetermined amount of angle.

It is noted that the layout screen also displays a completion key 108 and a reset key 109. The reset key 109 is for returning the operator's edited layout of the embroidery pattern 104 back to an original layout state of the embroidery pattern. The completion key 108 is for confirming the operator's edited layout of the embroidery pattern.

It is noted that FIG. 8 merely shows an example of the keys on the layout screen. The layout screen may further include a mirror key for producing a mirror image of the selected embroidery pattern, an arrangement change key for changing an arrangement how the selected embroidery patterns are arranged, and an interval changing key for changing an interval between the selected embroidery patterns.

After thus displaying the layout screen, the CPU 2 determines in S30 whether or not the rotation key 107 or 110 is depressed. If not (NO in S30), the CPU 2 determines in S32 whether or not keys other than the rotation key 107 or 110 are depressed. If so (YES in S32), appropriate processes are performed in S34. For example, when the arrow key 105 is depressed, the CPU 2 moves the pattern 104 by 0.1 mm in the arrow-indicating direction. As a result, the center B(XB, YB) of the pattern 104 is shifted from the center of the sewable region 103.

Figure 4:
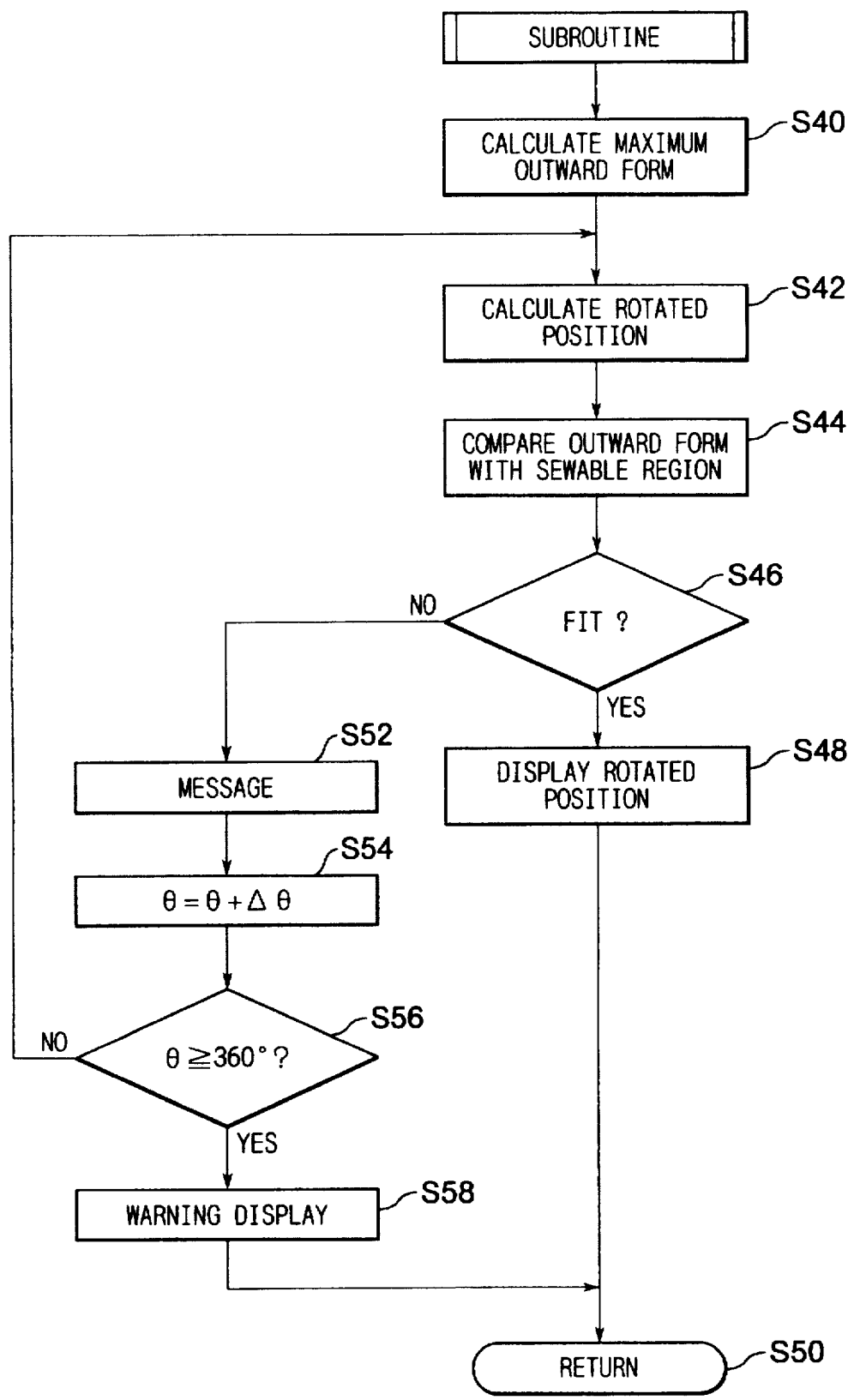
FIG. 4 is a flowchart of a rotational state judging process performed in the embroidery sewing operation of FIG. 3.

When the rotation key 107 or 110 is depressed (YES in S30), on the other hand, the CPU 2 judges in S31 whether or not the rotated embroidery pattern fits within the sewable region 103. That is, in S31, the CPU 2 executes a sub-routine shown in FIG. 4 to perform the rotational state judging operation.

The rotational state judging process of S31 will be described below. The routine of the rotational state judging process is repeated until it is detected that the rotated embroidery pattern properly fits within the sewable region 103.

First, the CPU 2 calculates in S40 the maximum outward form of the embroidery pattern 104. The CPU 2 calculates the maximum outward form of the embroidery pattern 104 in a manner as described below.

Figure 12:
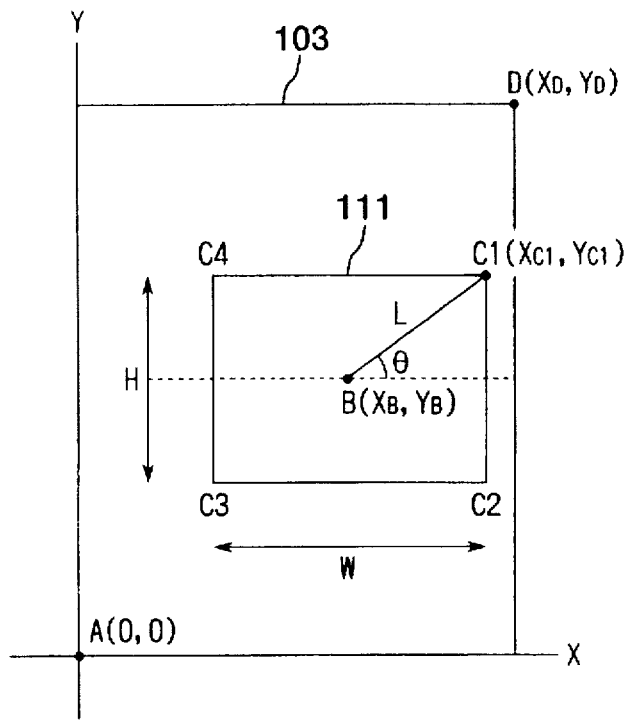
FIG. 12(a) illustrates how the maximum outward from of the selected embroidery pattern is in the sewable region before being rotated.
FIG. 12(b) illustrates how the maximum outward form of the selected embroidery pattern fails to fit within the sewable region after being rotated.
Figure 12:
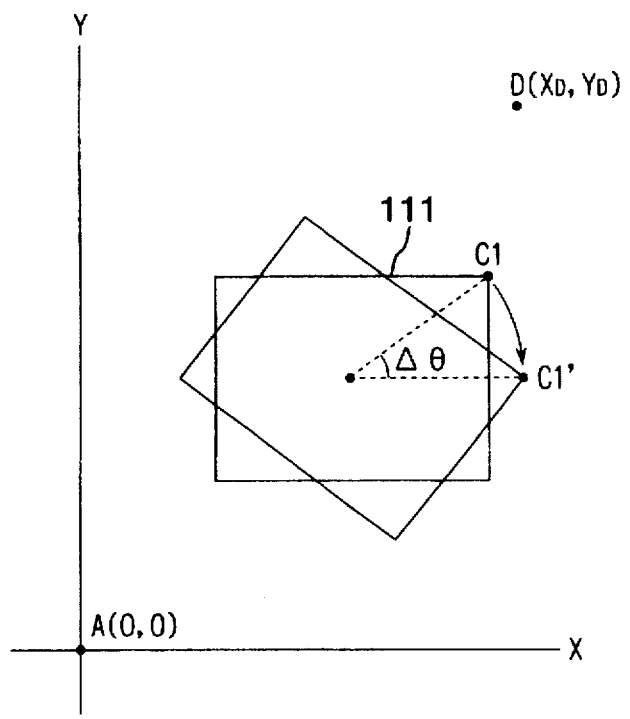

As shown in FIG. 12(a), a rectangular frame 103 is defined to represent the sewable region 103. The frame 103 is defined by the predetermined X-Y coordinate system. A lower left corner of the frame 103 is determined as the origin A(0, 0) of the X-Y coordinate system, and a right upper corner D has a coordinate (XD, YD). A rectangular frame 111 is defined to represent the maximum outward form of the embroidery pattern 104 displayed on the layout screen of FIG. 8. That is, the frame 111 has a height H and width W which are equal to those indicated in the layout screen of FIG. 8. The frame 111 has a central point B having a coordinate (XB, YB). The frame 111 has four corner points C1, C2, C3, and C4 which have coordinates (XC1, YC1), (XC2, YC2), (XC3, YC3), and (XC4, YC4), respectively. In S40, the CPU 2 calculates the coordinate values (XC1, YC1), (XC2, YC2), (XC3, YC3), and (XC4, YC4) of the corner points C1, C2, C3, and C4 based on the set of embroidery data of the embroidery pattern 104 which is retrieved from the ROM 3 or the flash memory 10. The set of embroidery data also includes data of the height H and the width W.

For example, the CPU 2 calculates the coordinate (XC1, YC1) of the corner point C1 by the following formulas:

$$XC1 = L \cos \theta + XB$$

$$YC1 = L \sin \theta + YB$$

wherein:

$$\tan \theta = H/W$$

$$L = ((H/2)^2 + (W/2)^2)^{1/2}$$

The CPU 2 calculates the coordinate values (XC2, YC2), (XC3, YC3), and (XC4, YC4) of the remaining points C2, C3, and C4 in the same manner as described above. The CPU 2 then stores the calculated coordinate values (XC1, YC1), (XC2, YC2), (XC3, YC3), and (XC4, YC4) in the RAM 4.

Next, in S42, the CPU 2 determines how the embroidery pattern 104, i.e., the outward form 111 rotates from the initial angular position of FIG. 12(a) by an angle Δθ into another angular position shown in FIG. 12(b) according to the operator's manipulation of the rotation key 107 or 110. That is, the CPU 2 calculates coordinate values (XC1', YC1'), (XC2', YC2'), (XC3', YC3'), and (XC4', YC4') of the corner points C1, C2, C3, and C4 in the rotated maximum outward form 111 of the embroidery pattern 104.

For example, the CPU 2 calculates the coordinate (XC1', YC1') of the corner point C1 of the rotated maximum outward form 111 by the following formulas:

$$Xc1' = L \cos(\theta - \Delta\theta) + XB$$

$$Yc1' = L \sin(\theta - \Delta\theta) + YB$$

wherein:

Δθ is a rotation angle by which the embroidery pattern 104 is desired to be rotated by the operator's manipulation of the key 107 or 110.

The CPU 2 calculates the coordinate values (XC2', YC2'), (XC3', YC3'), and XC4', YC4') of the remaining points C2', C3', and C4' in the same manner as described above.

The CPU 2 then stores the calculated coordinate values (XC1', YC1'), (XC2', YC2'), (XC3', YC3'), and (XC4', YC4') in the RAM 4.

Next, in S44, the CPU 2 compares the maximum outward form 111 of the rotated embroidery pattern 104 with the sewable region 103. That is, the CPU 2 compares the coordinate values (XC1', YC1'), (XC2', YC2'), (XC3', YC3'), and (XC4', YC4') with the coordinate value (XD, YD) of the right-upper corner D of the sewable range 103.

Then, the CPU 2 judges in S46 whether or not the rotated maximum outward form 111 of the embroidery pattern 104 fits within the sewable region 103. That is, the CPU 2 judges whether or not all of the points C1', C2', C3', and C4' are located within the sewable region 103. For example, the CPU 2 determines that the pint C1' is located in the sewable region 103 when XC1' satisfies the following inequality (1) and YC1' satisfies the following inequality (2):

$$0 < XC1' < XD \quad (1)$$

$$0 < YC1' < YD \quad (2)$$

Accordingly, the CPU 2 determines that the pint C1' is located within the sewable region 103 when $0 < L \cos(\theta - \Delta\theta) + XB < XD$ and $0 < L \sin(\theta - \Delta\theta) + YB < YD$.

The CPU 2 determines whether or not the remaining points C2', C3', and C4' are located in the sewable region 103 in the same manner as described above. The CPU 2 then determines that the embroidery pattern 104 fits within the sewable region 103 when all the points C1', C2', C3', and C4' are located in the sewable region 103.

Figure 13:
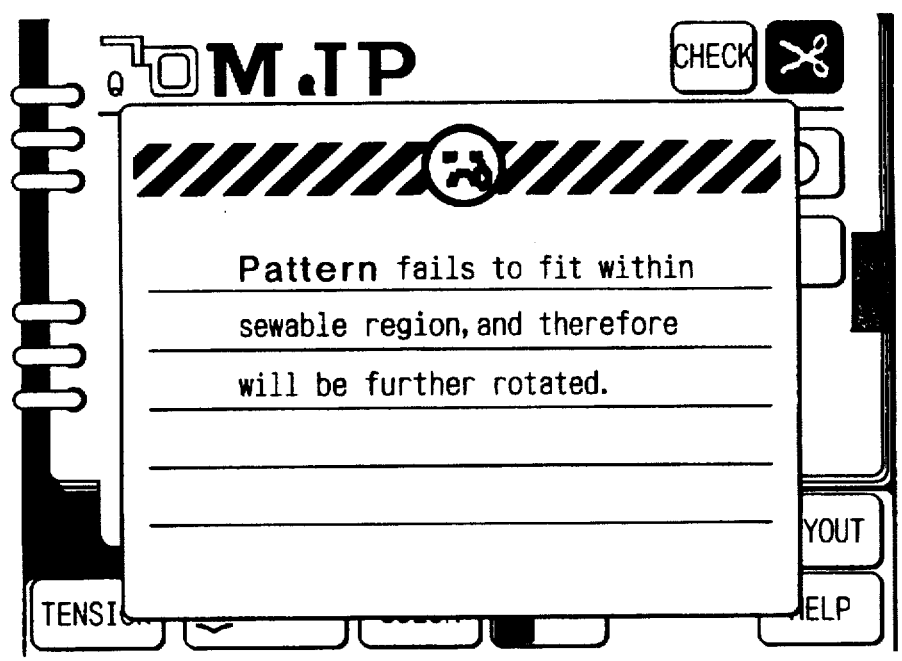
FIG. 13 shows one example of the layout screen displaying a message that a rotated embroidery pattern fails to fit within a sewable region.

When the CPU 2 determines that the maximum outward form 111 of the embroidery pattern 104 is not within the sewable region 103 (No in S50), the CPU 2 controls in S52 the LCDC 8 to display a message on the LCD 7 as shown in FIG. 13 to instruct the operator that the rotated embroidery pattern will fail to fit within the sewable region 103. Then, the CPU 2 further rotates in S54 the embroidery pattern 104 by $\Delta\theta$. As a result, the embroidery pattern 104 has been rotated from its original angular position by $\theta(=\theta+\Delta\theta)$ in total. The CPU 2 then determines in S56 whether or not the embroidery pattern 104 has been rotated by 360 degrees or more. That is, the CPU 2 judges whether or not the present amount of the rotated angle $\theta$ is equal to or greater than 360 degrees. When $\theta$ becomes 360 degrees or more, i.e., when the embroidery pattern has been rotated one complete turn or more (YES in S56), the CPU 2 controls in S58 the LCDC 8 to display on the LCD 7 an instruction that there is no need to rotate the embroidery pattern 104 more than one turn. Then, the program returns to the main routine shown in FIG. 3.

On the other hand, when the CPU 2 determines that the present value $\theta$ is less than 360 degree (NO in S56), the above-described processes S42, S44, S46, S52, S54, and S56 are repeated until the CPU 2 determines in S46 that the maximum outward form 111 of the embroidery pattern 104 fits within the sewable region 103. In this way, no improperly-arranged layout is selected, thereby saving the user the trouble of rearranging the embroidery pattern.

when the CPU 2 determines that the embroidery 104 fits within the sewable region 103 (YES in S46), the CPU 2 controls the LDCD 8 is S48 to display the rotated embroidery pattern 104 on the LCD 7. Then, the program returns to the main routine shown in FIG. 3.

Figure 9:
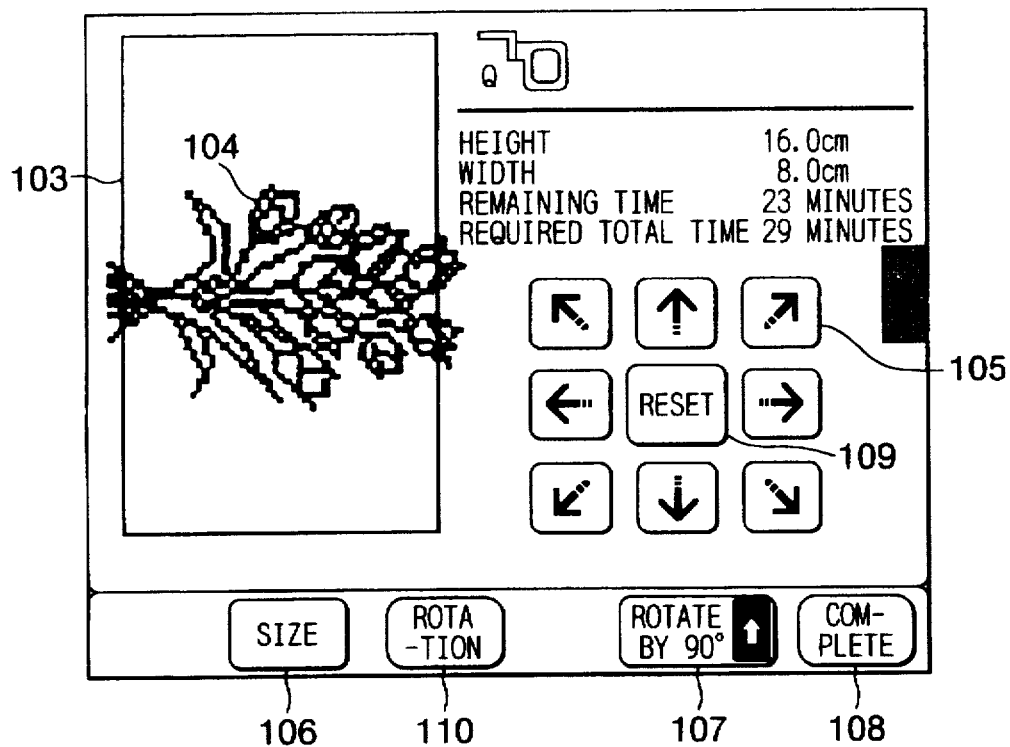
FIG. 9 shows another example of the layout screen, in which the selected embroidery pattern has been rotated by 90 degrees.

It is now assumed that the operator manipulates the 90-degree rotation key 107 to rotate, by 90 degrees, the embroidery pattern 104 which is initially arranged as shown in FIG. 8. When the embroidery pattern 104 is rotated by 90 degrees, the maximum outward form of the embroidery pattern will not fit within the sewable region 103 (NO in S46) as shown in FIG. 9. The CPU 2 therefore calculates in S54 the following formula: $\theta=90°+\Delta\theta(\Delta\theta=90°)$. In other words, the CPU 2 further rotates the embroidery pattern 104 by 90 degrees. As a result, the embroidery pattern 104 is angularly shifted from its original position of FIG. 8 by 180 degrees in total. Because this rotational amount $\theta$ of 180 degrees is lower than 360 degrees (no in S56), the program returns to S42. In S42, the CPU 2 calculates the maximum outward form of the embroidery pattern 104 which has now been rotated by 180 degrees. Then, the processes of S44 and S46 are performed to determine that the present angular position of the embroidery pattern 104 fits within the sewable region 103. The CPU 2 therefore controls in S48 the LCDC 8 to display the layout screen as shown in FIG. 10.

During the main routine of FIG. 3, when the completion key 108 is depressed (YES in S28), the program returns to S12, and the LCD 7 displays the embroidery pattern as shown in FIG. 7. At this time, when the start key 26 is depressed (YES in S16), the CPU 2 produces embroidery data in S18 based on the embroidery data of the selected embroidery pattern, which is retrieved from the ROM 3 or the flash memory 10, and the present angular position, the size, and the like of the embroidery pattern. The CPU 2 records the produced embroidery data in the Ram 4. The embroidery data may also be recorded in the flash memory 10 by the flash memory device 5 when instructed by the operator's manipulation of a record key (not shown). Then, the sewing portion 40 is controlled by the control portion 30 to sew the selected embroidery pattern 102 on the work fabric 22 at the appropriate angular position based on the produced embroidery data.

Figure 10:
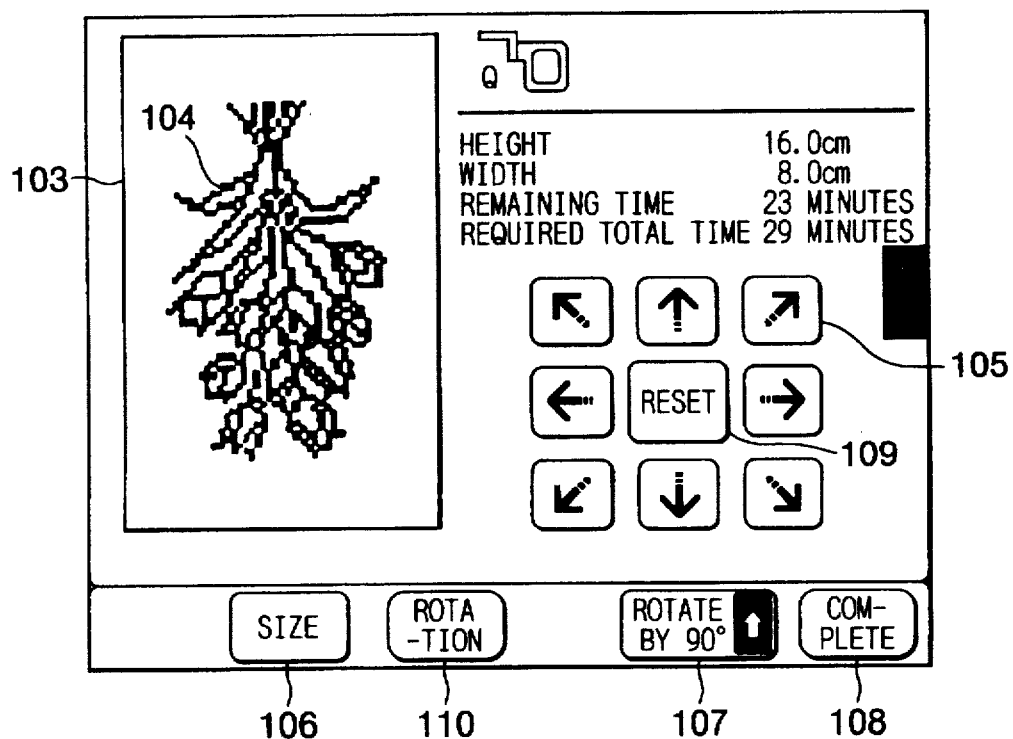
FIG. 10 shows still another example of the layout screen, in which the selected embroidery pattern has been rotated by 180 degrees in total.

It is noted that the CPU 2 repeatedly performs the processes of S30 and S31 while showing the layout screens of FIGS. 8 and 10 until the completion key 108 is depressed.

As described above, the embroidery pattern is located with respect to the predetermined sewable region 103 based on sewing pattern data (embroidery data) indicative of a shape of the embroidery pattern. The angular position of the embroidery pattern can be changed into another angular position through the operator's manipulation of the key 107 or 110. It is judged whether or not the angular position-changed embroidery pattern fits within the sewable region in S40–S46. When it is judged that the angular position-changed embroidery pattern fails to fit within the sewable region 103 (no in S46), the angular position of the embroidery pattern is further changed into still another angular position in S54, S42, and S44. It is indicated in S52 that the angular position of the embroidery pattern is further changed.

A modification of the rotational state judging process of S31 will be described below with reference to FIG. 11.

In this modification, the routine of the rotational state judging process is repeated a predetermined number of times at maximum.

Figure 11:
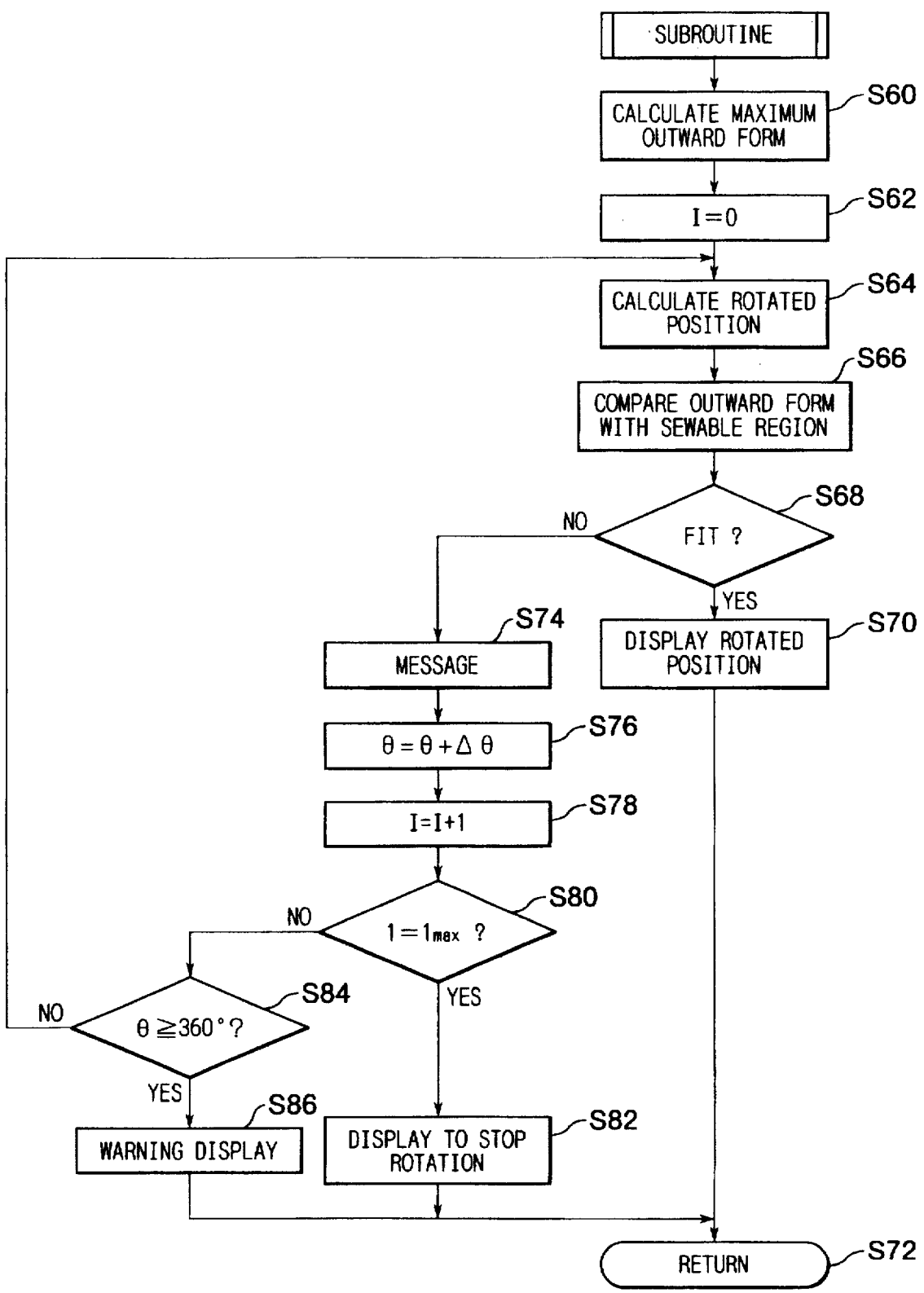
FIG. 11 is a flowchart of a modification of the rotational state judging process performed in the embroidery sewing operation of FIG. 3.

According to this modification, the sub-routine shown in FIG. 11 is executed in the rotational state judging process of S31 of FIG. 3. During this process, the CPU 2 first calculates in S60 the maximum outward form 111 of the embroidery pattern 104 in the same manner as in the above-described step S40 of FIG. 4. Then, the CPU 2 performs in S62 an initial setting to set a variable "i" to zero (0).

Next, in S64, the CPU 2 calculates the angular position of the maximum outward from 111 of the embroidery pattern 104 which is determined according to the manipulation of the key 107 or 110. Then, in S66, the CPU 2 compares, with the sewable region 103, the maximum outward form 111 of the rotated embroidery pattern 104. The CPU 2 judges in S68 whether or not the maximum outward form 111 of the rotated 360 degrees (YES in S84), the CPU 2 controls the LCDC 8 in S86 to display of message on the LCD 7 that there is no need to rotate more than one turn. Then, the program also returns to the main routine shown in FIG. 3. In this way, it is possible to prevent the embroidery pattern from being rotated so much that the embroidery pattern will be brought into an angular position greatly shifted from the user's desired angular position.

When the CPU 2 determines that the embroidery pattern 104 fits within the sewable region 103 (YES in S68), on the other hand, the LCD 7 displays the rotated embroidery pattern in S70 as shown in FIG. 10, and the program returns to the main routine in FIG. 3. In this way, no improperly-arranged layout is selected. It is possible to save the user the trouble of rearranging the embroidery pattern.

While the invention has been described in detail with reference to the specific embodiment thereof, it would be apparent to those skilled in the art that various changes and modifications may be made therein without departing from the spirit of the invention, the scope of which is defined by the attached claims.

For example, the above-described rotational state judging process can be further modified so as to judge whether or not the embroidery pattern 104 fits within the sewable region 103 when not only the angular position but also other positional states of the embroidery pattern 104 are changed through the operator's manipulation of the various layout changing keys 200.

When the program returns to the main routine from the subroutine via the step S58, S82, or S86, it has been determined that the selected embroidery pattern cannot fit within the sewable region 103 in spite of any angular rotations. Accordingly, in this case, the CPU 2 may prohibit the operator from depressing the rotation key 107 or 110 unless any other embroidery pattern is selected. That is, the rotation keys 107 and 110 may be brought into an inoperable state until any other embroidery pattern is selected.

For example, both in S52 of the example of the rotational state judging process and in S74 of the modification of that process, the CPU 2 controls the LCDC 8 to display on the LCD 7 the message to instruct the user that the embroidery pattern 104 does not fit within the sewable region 103. However, the CPU 2 may control the LCDC 8 to display on the LCD 7 that the embroidery pattern will be rotated to the next angular position pointed by an arrow in order to instruct the user that the embroidery pattern will be automatically rotated to the next angular position. Or, the CPU 2 may control the LCDC 8 to display on the LCD 7 a rotational angle θ, by which the embroidery pattern will be automatically rotated. Or, the CPU 2 may control an LED (not shown) provided to the sewing machine 20 to flash. In the above-description, the CPU 2 indicates in S52 or S74 that the pattern will be rotated to the next angular position before the pattern is rotated in S54–S44 or S76–S66 to the next angular position. However, the CPU 2 may indicate that the pattern has been rotated to the next angular position after the pattern is rotated to the next angular position.

In the above-described embodiment, the ROM 3 stores therein bit map data for displaying embroidery patterns on both of the pattern selection screen of FIG. 6 and the selected pattern screen of FIG. 7. The embroidery data of the plurality of embroidery patterns are stored in the ROM 3 and the flash memory 10. However, these data can be stored in other external storage media such as a floppy disk and a ROM card. These data may be retrieved from the external storage media and are displayed on the LCD 7 as required according to commands instructed from the CPU 2 in the same manner as described above.

Similarly, though the program data is stored in the ROM 3 in the above-described embodiment, the program data may be stored in an external storage medium.

The above-described embodiment is directed to a sewing machine provided with the sewing portion 40. However, the present invention can be applied to a sewing data processing device not provided with a sewing mechanism.

In the above-described embodiment, the CPU 2 calculates data for displaying the embroidery pattern shape 104 of the selected pattern on the layout screen of FIGS. 8 and 10 based on the embroidery data, of the selected pattern, retrieved from the ROM 3 or the flash memory 10. That is, the CPU 2 calculates display data of the selected pattern shape based on embroidery data indicative of needle locations for sewing the selected pattern. However, display data of the embroidery pattern shape 104 may be previously stored as well as embroidery data in the ROM 3 and/or the external storage media such as the flash memory 10. The display data will directly control the LCD 7 to display the selected pattern shape 104 as shown in FIG. 8. The embroidery data, indicative of needle locations of the selected pattern, will be used only for sewing the selected pattern. Alternatively, the ROM 3 and/or the external storage media may previously store only display data. The CPU 2 may produce embroidery data based on the display data. Or otherwise, the ROM 3 and/or the external storage media may previously store pattern data indicative of a plurality of embroidery patterns. The CPU 2 may produce both embroidery data and display data based on the pattern data.

In the above-described embodiment, the ROM 3 and/or the external storage media store therein data of a plurality of embroideries to be sewn on the work fabric 22. However, the ROM 3 and/or the external storage media may store a plurality of sets of sewing data of other various sewing patterns such as button hole sewing patterns and pocket sewing patterns. Each set of sewing data includes data indicative of needle locations of a corresponding sewing pattern. The CPU 2 may perform a process similar to the embroidery producing processes of FIG. 3, 4, and 11 to sew the pattern such as the button hole sewing patterns and the pocket sewing patterns.

In the above-described embodiment, the embroidery data includes data of the height H and the width W. However, the embroidery data may not include those data. The height data H and the width data W may be calculated based on the needle location data included in the embroidery data.

As described above, according to the sewing data processing device of the present invention, an operator's selected sewing pattern is located with respect to the predetermined sewable region based on sewing pattern data indicative of a shape of the sewing pattern. When the positional state of the sewing pattern is changed into another positional state, it is judged whether or not the sewing pattern fits within the sewable region after its positional state is changed. The positional state of the sewing pattern is further changed from the other positional state into still another positional state when the sewing pattern in the other positional state is determined not to fit within the sewable region. It is indicated that the positional state of the sewing pattern is further changed. Observing the indication, the operator will not have to rearrange the sewing pattern. In the embodiment, the sewing pattern is rotated about its center.

The positional state of the sewing pattern is further changed from the other positional state into the still another positional state until it is judged that the thus positional state-changed sewing pattern fits within the sewable region. A desired positional state of the sewing pattern is thus automatically found out. The operator will not have to find out the desired positional state of the sewing pattern.

In the embodiment, a shape of the sewing pattern is indicated. The operator can therefore easily grasp the changed positional state of the sewing pattern. The positional state of the sewing pattern may be changed the predetermined number of times at maximum. Accordingly, it is possible to prevent the positional state of the sewing pattern from being greatly shifted from the operator's desired positional state.

What is claimed is:

1. A sewing data processing device for processing sewing data, the device comprising:
   positioning means for positioning at least one sewing pattern, with respect to a predetermined sewable region, based on sewing pattern data indicative of a shape of the at least one sewing pattern;
   first positional state changing means for changing the positional state of the at least one sewing pattern into another positional state;
   judging means for judging whether or not the positional state-changed sewing pattern fits within the sewable region;

second positional state changing means for changing the positional state of the at least one sewing pattern from the other positional state into still another positional state when the judging means judges that the positional state-changed sewing pattern fails to fit within the sewable region; and indication means for indicating that the second positional state changing means changes the positional state of the at least one sewing pattern.

2. A sewing data processing device as claimed in claim 1, wherein the first positional state changing means includes rotation means for rotating the sewing pattern about its center to thereby change an angular positional state of the sewing pattern.

3. A sewing data processing device as claimed in claim 2, wherein the second positional state changing means includes rotation means for rotating the positional state-changed sewing pattern about its center to thereby change an angular positional state of the sewing pattern.

4. A sewing data processing device as claimed in claim 1, wherein the second positional state changing means changes the positional state of the positional state-changed sewing pattern into the still another positional state until the judging means judges that the thus positional state-changed sewing pattern fits within the sewable region.

5. A sewing data processing device as claimed in claim 1, wherein the indication means indicates a shape of the sewing pattern.

6. A sewing data processing device as claimed in claim 1, wherein the second positional state changing means changes the positional state of the positional state-changed sewing pattern a predetermined number of times at maximum.

7. A sewing data processing device for processing sewing data, the device comprising:

a positioning unit for positioning at least one sewing patter, with respect to a predetermined sewable region, based on sewing pattern data indicative of a shape of the at least one sewing pattern;

a first positional state changing unit for changing the positional state of the at least one sewing pattern into another positional state;

a judging unit for judging whether or not the positional state-changed sewing pattern fits within the sewable region; and a second positional state changing unit for changing the positional state of the at least one sewing pattern from the other positional state into still another positional state when the judging unit judges that the positional state-changed sewing pattern fails to fit within the sewable region.

8. A sewing data processing device as claimed in claim 7, further comprising an indication unit for indicating that the second positional state changing unit changes the positional state of the at least one sewing pattern.

9. A sewing data processing device as claimed in claim 7, wherein the first positional state changing unit includes a rotation unit for rotating the sewing pattern about its center to thereby change an angular positional state of the sewing pattern.

10. A sewing data processing device as claimed in claim 9, wherein the second positional state changing unit includes a rotation unit for rotating the positional state-changed sewing pattern about its center to thereby change an angular positional state of the sewing pattern.

11. A sewing data processing device as claimed in claim 7, wherein the second positional state changing unit changes the positional state of the positional state-changed sewing pattern into the still another positional state until the judging unit judges that the thus positional state-changed sewing pattern fits within the sewable region.

12. A sewing data processing device as claimed in claim 8, wherein the indication unit indicates a shape of the sewing pattern.

13. A sewing data processing device as claimed in claim 7, wherein the second positional state changing unit changes the positional state of the positional state-changed sewing pattern a predetermined number of times at maximum.

14. A method of processing sewing data, the method comprising the steps of:

positioning at least one sewing pattern, with respect to a predetermined sewable region, based on sewing pattern data indicative of a shape of the at least one sewing pattern;

changing the positional state of the at least one sewing pattern into another positional state;

judging whether or not the positional state-changed sewing pattern fits within the sewable region; and changing the positional state of the at least one sewing pattern from the other positional state into still another positional state when it is judged that the positional state-changed sewing pattern fails to fit within the sewable region.

15. A method as claimed in claim 14, further comprising the step of indicating that the positional state of the at least one sewing pattern is further changed.

16. A method as claimed in claim 14, wherein the sewing pattern is rotated about its center to thereby change an angular positional state of the sewing pattern.

17. A method as claimed in claim 16, wherein the positional state-changed sewing pattern is rotated about its center to thereby change an angular positional state of the sewing pattern.

18. A method as claimed in claim 14, wherein the positional state of the positional state-changed sewing pattern is changed into the still another positional state until it is judged that the thus positional state-changed sewing pattern fits within the sewable region.

19. A method as claimed in claim 15, wherein a shape of the sewing pattern is indicated.

20. A method as claimed in 14, wherein the positional state of the positional state-changed sewing pattern is changed a predetermined number of times at maximum.

* * * * *